United States Patent [19]
Blanie et al.

[11] 3,742,936
[45] July 3, 1973

[54] RHEOPLETHYSMOGRAPHIC DEVICE AND METHOD OF OPERATION

[76] Inventors: Jean Marie Michel Paul Blanie, 282 rue Saint Jacques, Paris, 5e; Jean Marie Rene Demange, 19 rue de Normandie, Bretigny-sur-Orge (Essone), both of France

[22] Filed: Oct. 21, 1970

[21] Appl. No.: 82,578

[30] Foreign Application Priority Data
Oct. 23, 1969 France.............................. 6936333
May 29, 1970 France.............................. 7019676

[52] U.S. Cl...... 128/2.1 Z, 128/2.05 S, 128/2.06 R, 235/191
[51] Int. Cl............................................. A61b 5/05
[58] Field of Search.................. 128/2.05 Q, 2.05 R, 128/2.05 V, 2.08 Q, 2.08 R, 2.01 Z; 235/186, 189, 190, 191, 192

[56] References Cited
UNITED STATES PATENTS

| | | | |
|---|---|---|---|
| 3,131,689 | 5/1964 | Rodler.................. | 128/2.01 Z |
| 3,340,867 | 9/1967 | Kubicek et al.................... | 128/2.1 Z |
| 3,149,627 | 9/1964 | Bagno.............. | 128/2.1 Z |
| 1,481,084 | 1/1924 | Dressler.......................... | 128/2.05 Q |
| 3,347,223 | 10/1967 | Pacela............................. | 128/2.1 Z |

FOREIGN PATENTS OR APPLICATIONS
869,844   3/1953   Germany....................... 128/2.06 R Primary Examiner—William E. Kamm
Attorney—Bacon & Thomas

[57] ABSTRACT

A rheoplethysmographic device (inductance plethysmograph) comprising a high frequency electric generator of which the voltage is applied to a subject by means of a pair of injection electrodes, characterised by the fact that the injection electrodes are placed in series with at least one current setting impedance interposed between the subject and the generator, at least one pair of collector electrodes being placed on the subject within the zone subjected to voltage by the injection electrodes, the voltage collected between the electrodes of each pair and that collected between one pair of points of a current setting impedance being subsequently led after amplification to a differential device and then to an indicating device for measurement, control recording or transmission, the position of the said pair of points being such that the voltage received between them substantially balances the mean voltage between the corresponding pair of collector electrodes so that after amplification of each of the said voltages and passage through the differential device, the output voltage varies about zero.

14 Claims, 12 Drawing Figures

INVENTORS
JEAN, MARIE, MICHEL, PAUL BLAINÉ
JEAN M. DEMANGE
BY
Bacon & Thomas
ATTORNEYS

RHEOPLETHYSMOGRAPHIC DEVICE AND METHOD OF OPERATION

INTRODUCTION

The present invention relates to new instruments for rheoplethysmography or inductance plethysmography, that is to say for the measurement of variation in volume of organs by measurement of variations in electric impedance. This invention is applicable in particular to measurements related to blood circulation and to respiratory activity in humans or animals, and in particular mammals.

PRIOR ART

It is known in the prior art to measure blood losses or respiratory activity by the measurement of impedance, with the aid of rheoplethysmographic instruments. Kubicek in particular has proposed the use of four electrodes in the form of relatively long ribbons and the application of a high frequency electric voltage with the aid of two first electrodes, called injection electrodes or exciting electrodes, conveniently placed one around the neck and the other around the base of the thorax of the subject; the difference in potential collected between two other electrodes, called collector electrodes or measuring electrodes, situated one around the neck but closer to the thorax than the injection electrode, and the other around the thorax but higher than the injection electrode, permits, after modulation, amplification, demodulation and rectification, a registration of the variation in impedance between the two collector electrodes to be obtained.

In a first instrument, Kubicek balances the impedance between the collector electrodes with the aid of a fixed resistance which is only acceptable in the case of certain subjects and certain positions of the electrodes; but it is evident that according to the function of the subject — man or animal, child or adult — and his state of morphology — fat or thin in particular — the impedances brought into play are extremely diverse.

In U.S. Pat. No. 3,340,867, Kubicek proposes, still with the same electrodes, an instrument in which a high frequency constant current oscillator is connected on one part to the subject by the injection electrodes (current excitation) and on another part in parallel with the subject to a potentiometer. The voltage collected at the collector electrodes is amplified, rectified and lead to a direct current differential amplifier. The voltage collected at the output of the potentiometer is similarly amplified, rectified and lead to a direct current differential amplifier. While the electrodes are attached to the subject, the potentiometer is regulated to produce at the output of the direct current differential amplifier a voltage in the neighbourhood of zero. This instrument, although constituting an improvement over earlier instruments, present the disadvantage of collecting between the collector electrodes voltages which vary with all the intrathorasic phenomena (blood circulation, respiration and digestion particularly). If cardiac activity is to be studied for example, the subject must in most cases in spite of all precautions taken, hold his breath to prevent false measurements being taken. Other phenomena, notably those concerned with digestion, intervene. On the other hand, if it is desired to study cardiac activity on a subject on board a vehicle, in the course of activity in work or sport, there are introduced variations due to the displacement of limbs and muscles whether under the command of the subject himself or as a result of the acceleration. Furthermore, the instrument of U.S. Pat. No. 3,340,867 is rendered complex since for balancing the subject and the potentiometric calibration device, recourse must be made to an oscillator in which the current is maintained rigorously constant.

Apparatus of this type operates in a manner which is not readily compatible with current medical practice and even more so when the subject is placed in the confined habitat of an experimental vehicle, which may be an aircraft or space vehicle, and submitted to accelerations of some magnitude.

BRIEF DESCRIPTION OF THE DRAWINGS

Reference is made to the drawings wherein:

FIG. 1 shows, for a normal man of average cardiac activity, an EKG or external electrocardiogram, a phonocardiogram PCG and a rheoplethysmogram RPG:

FIG. 2 illustrates the graphic method of determination of systolic volume;

FIG. 3 represents schematically the bodily impedance between two electrodes and FIG. 4 represents a simplification;

BACKGROUND DATA

FIG. 1 represents for a normal man of medium pulse, the electrocardiogram (EKG), the phonocardiogram (PCG) and the rheoplethysmogram (RPG) (having cardio aortic and arterial components only). The notation EKG corresponds to an electrocardiogram connected with the aid of external electrodes, as opposed to the notation ECG which tends in practice to be reserved to an electrocardiogram taken with internal electrodes, in the course of a surgical operation for example.

The cycle of cardiac activity includes the auricular systole (AS) in the course of which the auricles empty practically simultaneously into the ventricles through the auriculoventricular valves (sometimes called atrioventricular valves). At the end of the auricular systole (AS), the auriculoventricular valves close in AVC and the ventricular systole (VS) begins. The sigmoids open at SO, that is to say a little after the closure AVC of the auriculoventricular valves. This closure AVC appears to correspond on the one hand with the first heart beat B1 as illustrated by the phonocardiogram PCG, and on the other hand to the lowest point of the rheoplethysmogram RPG. During the systole, practically synchronously (as regards the two ventricles), the myocardium contracts and expels the blood on one hand towards the aortic artery in the case of the left ventricle and on the other hand towards the pulmonary arteries in the case of the right ventricle. The aorta inflates, as shown by the rise in the rheoplethysmogram which corresponds approximately to the portion ST of the electrocardiogram, adopting the classical notations of Einthoven. At the end of the ventricular systole, the rheoplethysmogram begins to fall and, at the closure of the sigmoids SC which correspond exactly with the appearance of the second heartbeat B2, the rheoplethysmograph registers one or several inflections as shown in FIG. 1. This corresponds exactly to the beginning of the diastole D. A little after this closure SC, the auriculoventricular valves open at AVO and the stopping of the second heartbeat B2 follows. In the course of the diastole D, the arteries (aorta and pulmonary) return to their base volume and the rheoplethysmogram falls; this fall is extended, incidentally, during the auricular systole AS which corresponds to P followed immediately by Q and R on the electrocardiogram.

The systolic volume can be calculated from the slope of the rheoplethysmogram at the rise which follows the first heartbeat, as is known from the prior art. Reference may be made on this subject to Kubicek W.G., Karnegis J.N., Patterson R.P., Witsoe D.A., Mattson R.R. "Development and Evaluation of Impedance cardiac output system" Aerospace Med. 37 (12) 1209–12, 1966.

Returning to FIG. 2, which represents a rheoplethysmogram RPG corresponding to a normal man of medium cardiac activity, one marks the abscissae of the changes of activity AVC and SC in FIG. 1 of the two heartbeats B1 and B2. It has been demonstrated in the prior art that if one traces the tangent $ab$ of the highest ascendant slope of the rheoplethysmogram corresponding in most cases to a point of inflection, and which is located between the first and second heartbeats, and if one marks the points $a$ and $b$ of this tangent of which the abscissae are those of the starts or changes of activity AVC and SC of the heartbeats B1 and B2, the difference $h$ of the ordinates of $b$ and $a$ are substantially proportional to the systolic volume.

In the above mentioned article by Kubicek there is described this method of determination of systolic volume and a rheoplethysmograph based upon the above described principles.

Reference may also be made to the following publications: Coleman Hertsman A., D'Agrosa L., Flath F. "Impedance measurement of cardiac output during moderate heat exposure" Aer. Sp. Med. Research Lab. T-R 66–5.

In the prior art, while one applies the graphic method illustrated in FIG. 2, if it is generally easy to trace the tangent at the maximum slope, the determination of the abscissae AVC and SC is more commonly effected manually by an operator who listens to the heartbeats with a stethoscope, which introduces substantial sources of error.

The present invention has as its aim to permit, amongst other things, continuous measurements without the necessity to arrest the respiratory activity of the subject, and with an apparatus of simple construction and therefore of low cost with an assembly comprising four electrodes or more, which is easy to set up and which does not interfere in the least with the movement of the patient. The operator of the apparatus has his task greatly simplified since it may be regulated by means of a single control member.

One such instrument permits equally the registration of such measurements and the association of the necessary calculating means necessary to obtain calculated results directly.

Another object of the present invention is to render more simple and easy the analysis of rheoplethysmogrammes on the one hand by eliminating the components which are annoying and parasitic and on the other hand by indicating clearly certain reference points or phenomena when they occur and with the use of a special instrument.

The invention has equally as its object the elimination, for example, of the respiratory components during a study of cardiac activity or vice versa.

Figure 5:
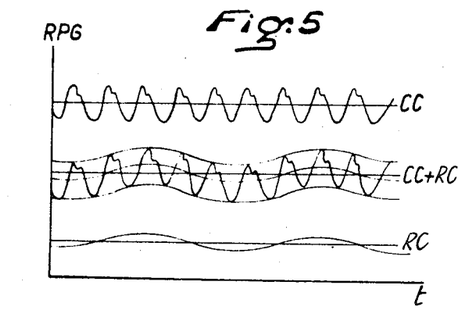
FIG. 5 illustrates very schematically the superposition of the cardiac component CC and the respiratory component RC on a rheoplethysmogram.

In the following description reference is made principally, by way of example, to the study of blood flow and systolic volume: FIG. 5 represents schematically, for a normal man and under average conditions, the circulatory component CC, the respiratory component RC and the combination of the two CC + RC obtained by rheoplethysmographic recording.

The effect of the superposition of the two components is quite apparent on the diagram CC + RC and it can be easily seen from this that if one wishes to study the circulatory component CC one seeks to eliminate the respiratory component RC in such a way as to stabilize the curve C about a base line of constant ordinate such as the axis of the recording tape.

The invention permits the registration for example on the rheoplethysmogram represented in FIG. 2, of a sharp peak or a square peak or pulse on the rheoplethysmogram itself, marking off the times of the starts or changes in the heartbeats (square peaks in mixed stretches, FIG. 2).

The invention also permits the production of the type of circuit used to avoid the inconveniences mentioned above in relation to the prior art. A high frequency generator is placed in series with the subject (between the injection electrodes) and a balancing and calibrating device. The current delivered by the generator can vary, and this is a frequent occurrence, especially in the case of measurements of long duration or where two experiments on the same subject are carried out with an interval in time which is not negligible. The device in accordance with the present invention permits an assurance that the same current traverses the subject and the balancing device, and compensates any eventual variations in current with time. The balancing device also permits, as will be described in the example below, the regulation of the current between the injection electrodes in spite of variations in impedance between electrodes, which also avoids recourse to a constant current oscillator.

The invention is therefore particularly applicable to the measurement of all variations in the volume of an organ and notably of the lungs, the heart, the different arteries, to the control of the circulatory activity in different parts of the body for example in the encephalon, to research into anomalies by differential measurements, for example for detecting a tumour by comparison of the encephalic circulatory activity right and left, to the control of the circulation continuously throughout the course of operations or in the course of treatments of long duration, and to obtain such measurements for the different cases while the subject is not easily accessible to the operator, in particular while he is on board a vehicle or while he is in movement, which is the case in transport by ambulance and in all studies in applied physiology (the physiology of work, of sport, of aeronautics, of astronautics etc.).

In order to render more comprehensible the following description it is convenient to recall the nature of the electric impedances of the body measured between two electrodes.

FIG. 3 represents schematically such an impedance; this is constituted on the one hand by the impedance of the skin which can be represented by a capacitance $C_s$ and a resistance $R_p$ in parallel, the impedance of the deep tissues being represented by a capacitance $C_1$ in parallel with a resistance $R_1$ which can itself be represented by a resistance $R_t$ which is fixed and corresponds to the tissues themselves and a resistance $R_b$ in parallel with $R_t$ and representing the variable resistance due to variations in the blood circulation; between two electrodes there is encountered the capacitance $C_s$ and the resistance $R_p$ at the input and at the output, and the combination $C_1$, $R_1$ between such input and output.

If there are applied potential differences at a sufficiently high frequency, the scheme is simplified and in particular it is possible to neglect the resistance of the skin and the capacitance of the deep tissues.

In this respect reference is made to Demange J., Demon G. "Influence de l'inhalation de $CO_2$ sur la rhéographie cérébrale" — Revue de médecine aéronautique et spatiale 1967 6 (2) 5–9.

The scheme of FIG. 3 can therefore be reduced to that of FIG. 4 which comprises a skin capacitance $C_s$ at the input which corresponds in practice to the combination (electrode + skin), the resistance of the deep tissues $R_t$ the variable resistance $R_b$ of the blood or organs, these two resistances being in parallel, and a capacitance at the output corresponding to the skin and the other electrode.

In the scheme of the apparatus given below by way of example the same indications will be given designating the impedance of the different tissues (skin and deep tissues).

In order to render more understandable the technical characteristics and the advantages of the present invention there will be described embodiments by way of example, it being understood that these are not intended to be limitative as regards their manner of construction nor as regards the applications to which they can be put.

DESCRIPTION OF PREFERRED EMBODIMENTS

Figure 6:
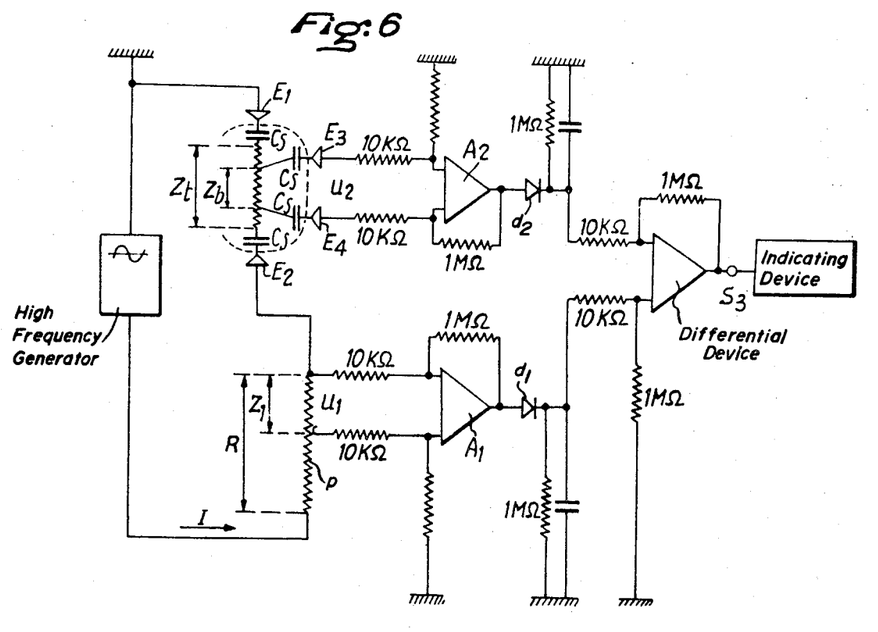
FIG. 6 represents schematically a rheoplethysmograph of four electrodes in accordance with the present invention, the values of resistance being given only by way of indication and being obviously capable of modification by a person skilled in the art in dependence upon conditions appropriate to the apparatus of the measurements to be made.

The apparatus of FIG. 6 comprises a high frequency generator HFG such as, for example, a conventional oscillator which can be a fixed frequency in the case of apparatus designed for ordinary use, or of variable frequency in the case of more sophisticated apparatus for use for example in research. Only those elements which are necessary to the overall understanding of the invention will be referred to by numeral or letter designation.

The remainder of the specific resistors and capacitors form a part of conventional systems. The frequencies used are generally higher than 100kHz. and more commonly of the order of 150 kHz. A setting or load resistance R is interposed between the generator and the body portion introduced between the injection electrodes E1 and E2. In the case of measurement of systolic volume, this resistance R permits the intensity of the current I to be maintained substantially constant. It can be chosen, for an average man, to be of the order of 500 to 600 ohms., for example 560 ohms. In effect, the total impedance of the body portion is generally within the range of 100 – 200 ohms, and the total variations due to blood between the electrodes correspond to an impedance of the order of several ohms. In this way the current passes through a total impedance of the order of 700 ohms and can be considered as set or imposed. It is possible to imagine the employment of a larger impedance by augmenting the load resistance R. This device does not modify to any appreciable extent the sensitivity of the measurement.

A variable portion $Z_1$ of the resistance R permits the collection by a potentiometer device P of simple and ordinary kind a potential difference $U_1$ which after amplification, is placed in opposition to the potential difference $U_2$ taken between the collector electrodes E3 and E4 previously amplified; this opposition is obtained with the aid of a differential amplifier D.

Whenever the impedance Z1 is equal to the impedance Zb, that is to say whenever the two voltages U1 and U2 are balanced, the needle of a galvanometer placed in the output of the system is at zero; a weak variation in Z1 leads to identical unbalance but in opposite sense to that provoked by an analagous variation in Zb; the device therefore permits at the same time the setting or imposition of a current and the measurement of the value of Zb and calibration of these variations.

If there is mounted at the output S3 a recorder such as a straight line ink recorder, again of conventional type, for example of one megohm input impedance and 25–40 Hz useful range, there may be obtained on one track a rheoplethysmographic recording and on a second track for example a phonocardiogram. There may alternatively be connected at the output S3 a device for transmitting the results over a distance, for obtaining transmitted measurements.

In FIG. 6, the different characteristics of the skin and deep tissues carry the same indices as in FIGS. 3 and 4, that is to say that Cs represents the capacity of the skin and the contact of the skin electrodes, Zp represents the impedance of the deep tissues between the injection electrodes, Zb the variable impedance due to modification of the deep tissues and the action of deformations of these tissues due to circulation or to respiration or any other physiological phenomenon. The electrodes E1, E2, E3, E4 may be constituted very simply by supple strips or bands of silver of the order of 1 cm width and 10 cm length and fixed on the subject by any conventional means, in particular with the aid of adhesive strips which should be non-allergic or hypoallergic and placed underneath in order to maintain contact with the skin. A simple and efficacious mounting of this kind is easily usable and bearable over relatively long periods without any notable reaction on the part of the subject, which is important for measurements of long duration. The short length of the electrodes avoids the inconveniences of those of the prior art which completely surround the thorax or the neck and are most uncomforatable to the subject as well as disturbing to the measurements as a result of the superposition of variations in impedance of respiratory origin or circulatory origin under conditions obliging the subject to hold his breath.

Figure 11:
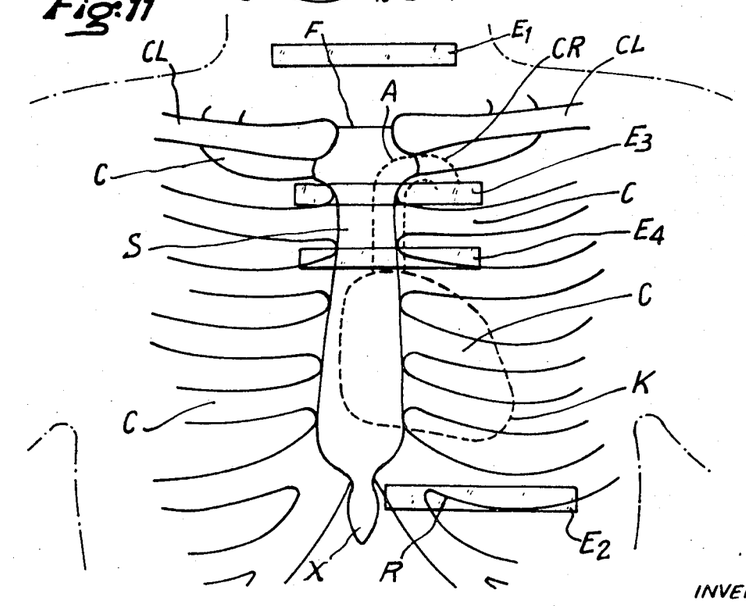
FIG. 11 represents schematically a human thorax fitted with four electrodes in accordance with the invention.

In accordance of the present example in which it is desired to measure variations in systolic volume, there are used electrodes of the form and dimensions described below which are placed preferably as follows. FIG. 11 shows schematically in front view a human thorax with an indication of the sternum S, clavicles CL and rib portions C; the heart K is represented very schematically in broken lines as is the part of the aortal artery A contained between the heart and the aortic arch CR. The relative position of the heart, the aorta and the other elements of the thorax can vary from individual to individual and the positioning of the electrodes by reference to these various organs or bones is given only by way of indication. The first injection electrode E1 (FIG. 6) is disposed at the base of the neck at 4 or 5 cms above the upper sternal notch. The second injection electrode E2 (FIG. 6) is placed at the base of the thorax on the left side substantially parallel to the costal rim R, on the Figure at the level of the xiphoid process X. The collector electrodes E3 and E4 (FIG. 6) are similarly placed on the anterior face of the thorax at the level of the aortic projection, (or part of the aorta between the heart and aortic arch), facing the aorta. This permits the inclusion between the collector electrodes of a zone where the aorta presents a part which is relatively cylindrical and regular. It is evident that the location of these various positions can be greatly facilitated by recourse to certain techniques which are well known and in particular by means of X-rays. The collector electrodes E3 and E4 are positioned generally 5 to 7 cms apart, a distance which varies according to the morphology of the subject; their median part is located towards the left hand side of the sternum, the four electrodes E1, E2, E3 and E4 being in this way disposed substantially horizontally whenever the subject is in a vertical position. Experience has shown that, for an average individual, such a disposition permits, when the injection electrodes E1 and E2 are energised, that the electrodes E3 and E4 are located substantially along equipotential lines, and this eliminates variations due to differences in potential along the electrodes. Variations of this kind are encountered in the prior art, notably when there are employed electrodes which surround largely or completely the neck or thorax and which can introduce considerable error in the resulting measurements.

Even with the procedure described above, there is collected at the output a signal which, in numerous cases, and in particular according to the subject, shows a respiratory component which is not negligible, that is to say that the recording instead of showing a curve CC (FIG. 5) shows a curve of the type CC + CR, that is to say a curve which undulates with the respiratory component instead of varying in a stable manner about the time axis or a straight line of constant ordinate.

In accordance with the present invention it is convenient, in numerous cases, whenever it is desired to study a type of phenomenon by means of rheoplethysmography, to eliminate those components which correspond to phenomena which are interfering or parasitic.

In the present example where the interest lies in the circulatory apparatus, and more precisely the heart, it is of interest to eliminate the respiratory component.

Figure 7:
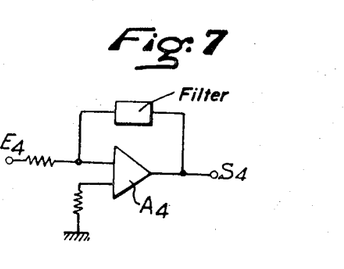
FIG. 7 represents schematically a filter device for eliminating interfering or parasitic components.

FIG. 7 shows a device of simple and conventional construction in the form of an electronic plan, in which there is injected at the input E4 the signal to be corrected, such as that collected at the output S3 of the device of FIG. 6. This signal is filtered with the aid of the device which comprises essentially a filter F in parallel with an amplifier A4, the filter F being controllable in frequency.

The application of such device to rheoplethysmogram permits the elimination of certain components on condition that it is adapted to the particular conditions of this technique; in the case of the respiratory component, for example, it is generally sufficient to eliminate frequencies below 0.5 Hz with the aid of a simple filter which passes the higher frequencies. The signal collected at the output S4 presents therefore a form such as that of the curve CC in FIG. 5, that is to say which corresponds practically exclusively to the cardiac component.

Such a device applied in the present example to the study of the heart, by eliminating the respiratory component, can be adapted to the greater part of the other fields of exploration of rheoplethysmography and in particular to the study of respiratory activity; with the electrodes disposed, for example, on the right hand side of the thorax, it is possible to eliminate the cardiac component with the aid of a low frequency passing filter which blocks the frequencies which correspond to cardiac activity.

It will be appreciated therefore that the same apparatus can be used for very numerous applications, the control of the filter permitting the elimination of components which are interfering or parasitic and notably background noise. However, experience has shown, notably in the case of high frequency passing filter, that if the fundamental frequency and eventually the first harmonics are eliminated, certain higher harmonics can appear and interfere; in order to eliminate these frequencies, recourse can be made to the differential system shown in FIG. 9. This system comprises essentially a differential amplifier A6 mounted in a conventional manner and inputs E6 and E'6 and an output S6. By using two channels of measurement such as those represented in FIG. 6, and as a consequence, two pairs of collector electrodes with one same pair or two pairs of injection electrodes according to the morphology of the subject, the zone of study or the nature of the phenomena the measurements are to convey, there is collected between one pair of collector electrodes a signal at the corresponding output S3 (FIG. 6), while the other pair of collector electrodes provide by way of the other channel, in an analagous manner, another signal.

Figure 9:
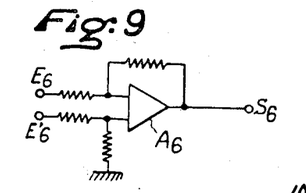
FIG. 9 represents schematically a device for the addition or subtraction of components.

In the example above described there is collected on the one hand, on one channel, on the left hand side, a rheoplethysmographic signal having a predominant cardiac component and a weak respiratory component, and on the other hand over the other channel, a respiratory component obtained, for example, on electrodes placed on the right of the thorax and a weak cardiac component. After eventual filtration of the cardiac component of the signals collected on the right hand side, by treatment of the rheoplethysmographic recording of the respiratory activity, for example with the aid of a device such as that of FIG. 7 furnished with a low frequency passing filter, there is injected at E6 with eventual modification of the polarities for differential activation, the signal collected at S3 by the collector electrodes placed at the level of the heart and at E'6, the signal provided by the right hand electrodes which is predominantly respiratory and is eventually filtered as has been described above and of which the level has been adjusted so that in the differential device A6, the respiratory component of the signal recorded at the left and injected at E6 should be compensated by the inverse component applied at E'6 and provided by the right hand side.

The combination of devices such as those of FIG. 7 and 9 therefore permit the elimination of interfering or parasitic components. On the other hand, as has been described above, it is often desirable for the user to superimpose on the rheoplethysmographic signal certain recordings. In rheoplethysmographic studies of the heart, for example, it is often of interest to signal clearly the starts of the two principal heartbeats which correspond respectively, as has been described in the introduction to the present application, to the closure of the auriculoventricular valves and the closure of the sigmoids. The systole is produced between these start points.

A similar interest may be attached to the superimposition on the rheoplethysmogram of indications corresponding to certain characteristics of the electrocardiogram. This may be of even more interest since, from the technical point of view, it is possible to use conventional means for recording the electrocardiogram, in particular with recourse to the same electrodes as those used for the rheoplethysmographic recording. This can constitute an advantage particularly with regard to the indication of elements of phonocardiographic origin which necessitate the mounting of a sound detector, generally a type of microphone.

Referring to FIG. 1, the electrocardiogram EKG typically presents high points R and T and low points Q and S and it may be of interest to superimpose on the rheoplethysmogram RPG the crests of one or several of these points or signal in such a form that the starts correspond to one or several of these points. This can be of interest in the case of the very sharp peak R which precedes only slightly the closure of the auriculoventricular valves and the start of the first heartbeat B1 and the low point of the rheoplethysmographic cycle RPG.

In any case, whatever the form of the signal which may be collected by any adequate means, it is possible to superimpose on the rheoplethysmogram indications corresponding notably to the phonocardiogram and the electrocardiogram under the conditions described hereafter.

Figure 8:
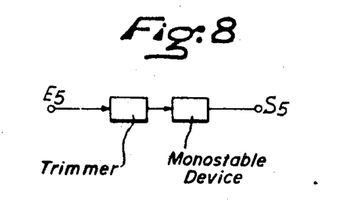
FIG. 8 represents schematically a device for trimming and shaping of a signal.

The device of FIG. 8 permits, by way of a non-limited example, upon injection at E5 of a phonocardiographic signal, a trimming operation in the trimmer TR which allows the passage only of the peaks of the heartbeats and which eliminates the weak zones and background noise and then shapes them by way of a monostable device MS which permits the collection at the output S5 of pulses of predetermined form according to the type of monstable device and its control and in particular of which the amplitude and duration are chosen in advance. This therefore permits, by the subsequent superposition with chosen polarity and with the aid of a device such as that of FIG. 9, on the signal collected at S3 on the device of FIG. 6, the production of a cardiac rheoplethysmogram on which small square peaks of well defined dimensions indicate the start and finish of the ventricular systole, that is to say the beginning and end of the heartbeat.

The device represented in FIG. 6 comprises a single channel of measurement, that is to say a single pair of collector electrodes. One can of course imagine several pairs of collector electrodes or a single pair of injection electrodes, each pair of collector electrodes requiring its own appropriate circuit such as that shown in FIG. 1. Such a device is seen in FIG. 12.

Figure 12:
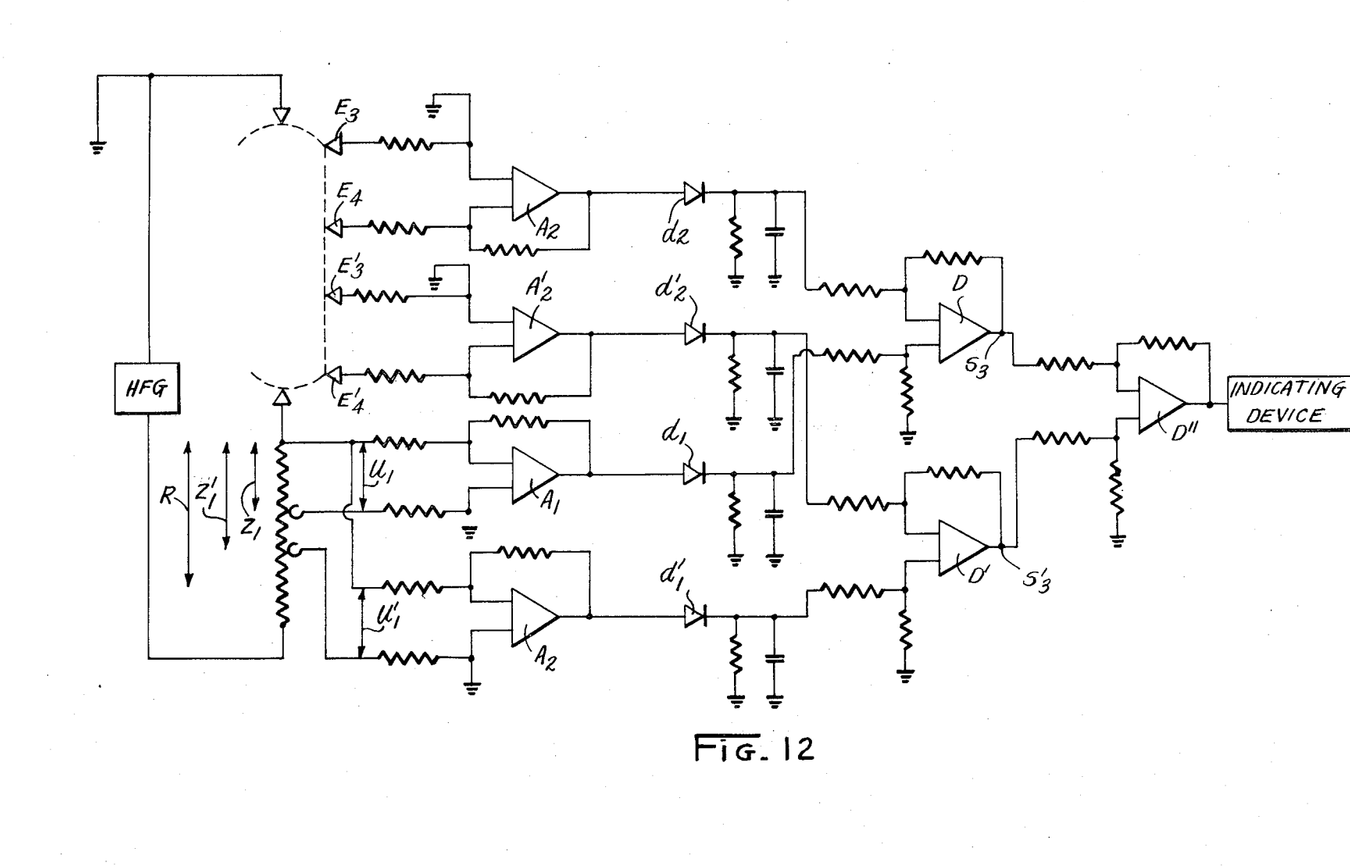
FIG. 12 is a circuit illustrating another embodiment of the invention.

FIG. 12 is a schematic illustration of the device of FIG. 6 wherein two pairs of collector electrodes are used. Therefore, the reference letters and numerals are the same with primes (') added where appropriate. The circuit further includes a common differential amplifier D which in effect incorporates the circuit of FIG. 9 therewith.

The generator and the injection electrodes being the same, the selection of the voltage U1 corresponding to the impedance Z1 is different according to the position of the different pairs of electrodes E3 and E4. It is possible in this way to study for example, anomalies in the encephalon if there is placed an injection electrode on the frontal and an injection electrode diametrically opposite with reference to the cranium or calvaria; two pairs of collector electrodes placed one pair on a right hand side and the other pair on the left hand side of the calvaria permits the revelation of any disymmetries, particularly the presence of tumours.

A device such as that shown in FIG. 6 is particularly adapted to the measurement of systolic volume. The impedance values indicated on the Figure or in the description are particularly suited to this application. It is possible to contemplate, with eventual controls and modifications, the utilisation of the same apparatus for other studies such as the study of respiratory activity, renal activity, hepatic activity or more generally the study of all physical or chemical phenomena which bring about variations in characteristic impedances. The same studies may be carried out as described above with several channels for measurement recording.

When it is desired to use an apparatus such as that shown schematically in FIG. 6, the electrodes are placed as described above with reference to FIG. 11 in the case which has been chosen as an example and which relates to the measurement of systolic volume. As has been emphasised, experience has shown that the disposition of the electrodes in the way described above allows the two collector electrodes to coincide substantially with lines of equipotential in the electric field created between the injection electrodes.

If there is disposed at the output S3 of the circuit of FIG. 6 a recorder of conventional type, the control of the calibrating resistance Z1 permits the balancing of the two channels so as to produce a corrected recording on the rheoplethysmogram which does not escape beyond the limits of the recorder and which is sufficiently readable. If the potentiometric device which permits regulation of the calibrating resistance Z1 is graduated and if the positions of the electrodes are sufficiently rigorously marked, it is possible to carry out measurements on the same subject several times over by replacing the electrodes in the same positions and by adjusting the calibration resistance to the same value.

It is possible to juggle in a similar way with the operating amplitude and with the balancing by acting upon the amplifiers A1 and A2 for the two channels corresponding respectively to calibration and to the subject and of course upon the differential amplifier D. In the case of certain subjects and in particular certain mammals, one can be brought to using calibration resistances which are quite different from the impedance between the electrodes, the balancing being performed by a recovery through the means of amplifications in the two channels. It should be stated similarly that it is generally useful to correct the rejection phenomenon which is well understood by a person skilled in the art in connection with differential amplifiers. It is possible to use any adequate conventional device.

As has been stated above, it is possible to associate with the rheoplethysmogram the recording of the phonocardiogram, which may be done with a two-pen recorder, one pen describing the rheoplethysmogram and the other the phonocardiogram, but if use is made of apparatus conforming to the present invention (FIGS. 8 and 9) and which permits the superposition, after amplification and shaping of the phonocardiogram on the rheoplethysmogram it is sufficient to use a single pen recorder. There will be described later a simple device which permits easy measurement of the value of the height $h$ which is the difference of the ordinates at the points $a$ and $b$ of FIG. 2 and which is proportional to the systolic volume and the impedance Zb.

It is similarly possible with the aid of a two pen recorder to record on the one hand the rheoplethysmogram and the phonocardiogram in superimposed relationship as indicated in FIG. 2, and to record with the second pen a time indicating device for example time pips every 10 seconds or every second; this permits the easy calculation of the pulse even if the speed of the recorder is susceptible to variation. This permits similarly an appreciation of the evolution of time and in particular the rapidity of variation of the magnitude being measured, for example the systolic volume in the course of absorption of a medical product or in the course of a surgical operation or medical experiment in work, sport, aeronautics or space.

Furthermore, as has been stated above, as association of the rheoplethysmogram with an electrocardiogram can be brought about with the aid of external electrodes (EKG) as well as with the aid of internal electrodes in the course of a surgical operation (ECG); it is sufficient to fit the recorder with a particular pen but as regards the electrodes, it is of course possible to use one of the necessary electrodes for the rheoplethysmographic measurements and another electrode which can be placed at any desired point on the subject, for example at a wrist or ankle; the choice of position and the circuits used are well known in the prior art and the man skilled in the art can, in particular, determine the placement of the electrodes in dependence upon the function of the study envisaged.

It is possible similarly to associate the rheoplethysmogram with recordings performed by piezoelectric means, for example with a piezocarotidogram or an apexogram, which correspond respectively to a piezoelectric measurement at the level of the carotids and of the apex of the heart, these measurements being simply external in the majority of cases.

The association of these different measurements may be more interesting in certain cases, as for example in the case of the piezocarotidogram; its recording in isolation is not always significant since it permits the evaluation of the duration of the deformation rather than the importance or magnitude of the contraction or inflation of the carotids. What is of interest in the latter case is to record rather the time as a variable than the flow or the volume.

In a preferred form of the invention it is interesting to record, for example on a four pen recorder, the rheoplethysmogram and what is currently called the cardiacmecanogram, that is to say the association of the piezocarotidogram, the apexogram and the phonocardiogram; these three recordings may use the three extra pens; but if the phonocardiogram is superimposed upon the rheoplethysmogram, in accordance with the invention, the fourth pen may be used for an electrocardiogram or for timing pips.

In certain cases it may be useful to reserve a pen for other indications such as indications of submission to voltage or those corresponding to other particular applications relating either to the apparatus or to the subject or to indications of the beginning of the experiment.

The devices for piezoelectric, phonoelectric, chronographic or electrocardiographic recording may be of any adequate type and are largely known in the prior art.

It is also contemplated, as stated above, to place at the output of the circuit not a recorder but rather an oscillograph or eventually a transmitter if the subject is in a position inaccessible to the operator, notably in a vehicle in motion. This application is particularly interesting in the field of physiology of work, sport or aeronautics or space propulsion, or again in ambulances.

Figure 10:
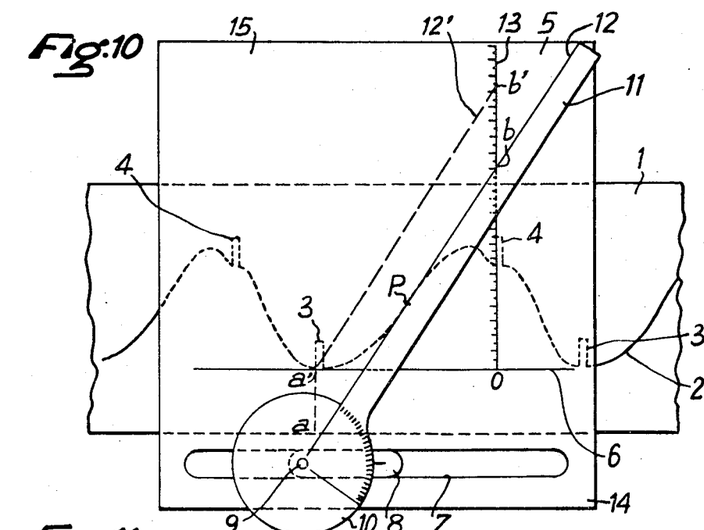
FIG. 10 represents schematically a device for analyzing the rheoplethysmogrammes.

When use is made of a conventional recorder recourse can be made to the following device for determining rapidly the height h of FIG. 2. This device can be connected to the recording apparatus in accordance with the invention or it may be used independently on any type of support for analysis of the tape; this apparatus is very schematically shown in FIG. 10: the recording tape 1 is laid flat on a support surface such as a table for example; the tape 1 carries a rheoplethysmographic recording 2 showing square peaks 3 and 4 obtained in accordance with the invention and which correspond to the starts or change points of the heartbeat: the first beat at square peak 3, the second beat at square peak 4. There is placed on the tape 1 a rectangular support plate 5 which is transparent over the whole or over a large part of its surface and which presents a reference line 6 which is to be superimposed parallel to the longitudinal stripes of the recording tape 1 or one of its two edges. This line 6 should pass through the lowest point of one of the square peaks 3 of a first heartbeat. Another line 13 perpendicular to the line 6 is similarly traced on the plate 5 and should be manipulated so as to pass through the start at peak 4 of the second heartbeat immediately following the selected peak 3. This support plate 5 is formed parallel to the line 6 with a part in the form of a slide 7 in which is displaceable a runner 8 which is itself preferably transparent; this runner is provided with an axle 9 perpendicular to the plane of the support plate 5 and on which can rotate an element such as a disc 10 provided with a rule 11 which defines a reference line 12 which is preferably diametric and which may be one of the edges of the rule 11. By manipulation of the runner 8 and the disc 10 which is rigid with the rule 11, the line 12 is brought into coincidence with the tangent at the maximum slope of the rheoplethysmogram at the point of inflection P contained between the square peaks 3 and 4 of the first and second heartbeats. Any suitable device permits by a system of graduation of the disc 10 the exact marking of the angle between the slope of the tangent 12 and the direction of motion of the tape; the line 13 perpendicular to the line 6 is graduated linearly from the point of intersection O with the line 6 and this permits the evaluation either of the impedance between the collector electrodes or the systolic volume.

The support plate 5 being disposed as described above and the line 12 of the rule 11 being in coincidence with the tangent of maximum slope at point P, the assembly consisting of the runner 8, axle 9, disc 10, rule 11 is moved along the slide 7 so as to bring the line 12 through the lowest point of the changeover indicated by square peak 3; the line 12 takes up the position 12' represented in broken line and the intersection of the line 12' with the line 13 which is marked with graduations on the support plate 5 is a point $b'$ of which the ordinate measured along the graduation of the line 13 is proportional to the measured volume. The point $a$ and the point $b$ represented on FIG. 2 are referenced in FIG. 10 by the same letters and it is easily appreciated that the quadrilateral $a\ a'\ b'\ b$ being a parallelogram, the difference of the ordinates $a$ and $b$ is equal to the difference between the ordinates $a'$ and $b'$, so that the height $h$ of FIG. 2 is given by O $b'$ in FIG. 10. This device therefore gives the required height H independently of the speed of the tape which can cause variation in the distance between square peaks.

The sliding and pivoting device can be constructed in any conventional manner known in the art relating to the construction of rules, discs and mechanical calculators. This construction should be such that the rubbing and sliding movements permit easy manual displacement of the different pieces with respect one to another but so that nevertheless the pieces maintain their positions if desired; in particular the movements should be such that it is possible to bring a line 12 easily into coincidence with the tangent at the point P and that the assembly of runner, disc and rule can subsequently easily be caused to slide to bring the line 12 through the point $a'$ without the disc 9 and the rule 11 rotating with reference to the runner 8, so as to ensure that the position 12' of measurement and the position 12 of superposition of the tangent at the point P remains strictly parallel.

The disposition of the support plate 5, the runner, the disc and the rule are chosen in dependence upon the average dimensions of the recordings; in particular it is possible to contemplate placing the support plate 5 directly on the recorder and permitting it to slide similarly perpendicularly and parallel to the tape to effect a measurement on the recorder itself. It is possible further to contemplate variations notably in placing the runner and the slide in a high position or in a medium position by reference to the tape. However, the slide is disposed preferably in a low part 14 or high part 15 of the support plate 5 in order to clear the recording curve and to facilitate reading. If the phonocardiogram is not superimposed upon the rheoplethysmogram, it is necessary to mark the point $a'$ and to coincide the line 13 with the start of the second heartbeat.

Furthermore it is evident that the turning assembly 10–11 is capable of modification. It is possible to use either a complete disc or a partial disc of larger diameter than that shown in FIG. 10.

Having regard to what has just been said on the subject of recordings, it has been stated that these refer to those obtained by placing a recorder at the output S3 of the device of FIG. 6, but it is quite obvious that this applies equally well where recourse is made to filtering devices. It should also be stated that as has been said above, it is possible to use in place of the differential device of two channels of FIG. 6, devices of more than four electrodes and of more than two channels, which permit the achievement of comparative or differential measurements between the activities of two subjects or two parts of the same subject such as the two cervical lobes, the two lungs or the two kidneys.

On the other hand reference has been made in FIG. 1 to a load impedance; it is possible to contemplate the use of many, particularly in the case where it is desired to use more than one pair of collector electrodes. It is possible similarly to use one common load impedance for a pair of injection electrodes and several pairs of collector electrodes. The voltage U1 in FIG. 6 is then selected, for balancing the voltage U2 of each pair of collector electrodes, between one pair of common loading impedance points (one extreme point and a sliding point for example).

It should also be noted that a device such as that shown in FIG. 6 comprises rectifier $d_1$ and $d_2$ respectively in each channel between the amplifier and the differential amplifier. This conventional arrangement can give rise to numerous variations, the system of rectification not necessarily requiring the mounting of the circuit indicated in FIG. 6; the person skilled in the art can in any case choose the different elements of the circuit to suit his need and to suit other circuit elements.

As has been remarked above, within the scope of the present invention, it is possible to imagine devices such as that of FIG. 6 — eventually modified — or provided with the devices of FIGS. 7, 8, 9 or more than two channels and the signals collected at the output may be lead directly to an indicating device, a recording device or a transmitting device after any necessary modulation or coding. This arrangement may be important, as has been emphasised, when the subject is isolated from the operator; this is case for example of trials in certain enclosures for tests of temperature or pressure or when the subject is in a habitat, often narrow, of a vehicle in motion especially for aeronautic or space experiments; it is similarly the case in the experimental control of a subject in motion in the field of the medicine of work or sport. It should be remarked, similarly, that such a system of transmission and reception can be of interest where several subjects need to be controlled quasi-permanently and this can be carried out with the aid of a single receiver having a frequency of reception which can be adjusted to that of different transmitters placed at the output of instruments in accordance with the invention applied to a series of subjects to be studied, without there being any need to place transmission lines between the subject and the operator; this permits in particular, in a hospital, the reception in a central room of rheoplethysmogrammes of several patients simultaneously as well as in a sequential manner which permits the operator to pass periodically from one to another in a quasi-continuous surveillance, with one receiving apparatus.

In the above, there have been considered recording devices and devices for analysing diagrams with rectangular co-ordinates. It is of course obvious that within the bounds of the invention it is possible to use disc recorders or tape recorders in which the pens describe arcs of a circle. A simple geometric modification of the analysing device of FIG. 8 for cartesian co-ordinance will permit a person skilled in the art to adapt it to all systems of co-ordinates. The selection of systems of co-ordinates, dimensions of the recording matrix (tape, disc or the like) of the running speed and of the amplitude of movement of the pens, over and above conventional technical considerations, upon experimental conditions and in particular the duration of the experiment and the rapidity of variation from one cycle to another of the phenomenon being recorded.

As regards the electrodes, it is worthy of remark that the best results are obtained with electrodes disposed along equipotential lines in the electric field created by means of the injection electrodes. This is why the electrodes are preferably elongate, notably in the form of ribbons, and sufficiently short to follow an equipotential line. It is possible similarly to use collector electrodes which are punctiliar or quasi punctiliar but these are in certain cases more sensitive to local displacement of equipotential lines. The dimensions of the electrodes in accordance with the invention depend therefore essentially upon the subject and upon the extent of the zone to be studied.

Finally, the devices in accordance with the present invention may be applied to all measurements of variation in impedance of an object in which can be created an electric field with the aid of injection electrodes, a field it is possible to explore with the aid of collector electrodes.

We claim:

1. A rheoplethysmographic device comprising:
   a. a high frequency generator,
   b. a pair of injection electrode means for applying the voltage generated by the generator to a subject,
   c. at least one pair of collector electrodes for placement on the subject within the zone subjected to voltage by the injection electrodes,
   d. at least one current setting resistive element connected in series with the injection electrodes and the generator,
   e. means for balancing the voltage collected between the collector electrodes and the voltage collected between one pair of selected points on said current setting resistive element, said balancing means including an amplifier connected across said collector electrodes and an amplifier connected across the pair of selected points and a first differential device connected to said amplifiers
   f. an indicating device connected to said differential device,
   g. the position of the pair of selected points being adjustably positioned whereby the voltage received between the selected points substantially balances the mean voltage between the corresponding pair of collector electrodes so that after amplification of each of the voltages and passage through the differential device, the output voltage to said indicating device varies about zero.

2. A device according to claim 1 including means for rectifying the voltage collected between the electrodes of each pair and that collected between each pair of selected points before being fed to the differential device.

3. A device according to claim 1 wherein at least the collector electrodes are in the shape of narrow strips which permits their placement substantially along equipotential lines.

4. A device according to claim 1 comprising a plurality of pairs of collector electrodes and corresponding amplification channels.

5. A device according to claim 4 including a plurality of pairs of movable voltage receiving points arranged on said at least one current setting resistive element and corresponding amplification channels, said plurality of pairs of points being equal in numer to the number of pairs of collector electrodes.

6. A device according to claim 1 including before said indicating device filter means for eliminating the components of frequencies corresponding to phenomena other than those rheoplethysmographic components which are to be studied.

7. A device according to claim 1 including a second pair of collector electrodes, a second differential device connected to said second pair of collector electrodes, a third differential device connected to said first and second differential devices, a means for adjusting the signal level to said third differential device and said third differential device connected to said indicating device.

8. A device according to claim 1, including a different system of monitoring an organic phenomenon, means for receiving a signal from said different system of monitoring an organic phenomenon, and means for trimming, shaping and superimposing the signal transmitted to the indicating device.

9. A device according to claim 8 wherein the said different signal is a phonocardiographic signal.

10. A device according to claim 8 wherein the said different signal is a signal of electric activity.

11. A device according to claim 10 wherein the signal of electric activity is collected from at least two electrodes, at least one of which is an electrode of the rheoplethysmographic device.

12. A device according to claim 11 wherein the different signal is an electrocardiographic signal.

13. A rheoplethsymographic method comprising the steps of:
   a. placing a pair of injection electrodes on a subject,
   b. placing a pair of collector electrodes on the subject,
   c. generating a high frequency voltage by means of a generator,
   d. applying the voltage to the subject through the pair of injection electrodes,
   e. connecting a current setting resistive element in series with the injection electrodes and the generator,
   f. collecting voltages from selected points of said resistive element,
   g. balancing the voltage collected between the collector electrodes and the voltage collected between a pair of points on the current setting resistive element, and
   h. connecting an indicator to the collector electrodes and points and indicating changes in the subject's body represented by changes in voltage across the collector electrodes.

14. A method as defined in claim 13 used to measure the systolic volume wherein the electrode placing includes placing one of the injection electrodes above the subject's sternal notch at the level of the neck, placing the other injection electrode at the base of the subject's thorax on the left side substantially parallel to the costal rim, and placing the collector electrodes on the face of the thorax at the level of the aortic projection facing the aorta.

* * * * *